(12) United States Patent
Campbell

(10) Patent No.: US 9,426,174 B2
(45) Date of Patent: Aug. 23, 2016

(54) PROTECTING COMPUTING ASSETS FROM SEGMENTED HTTP ATTACKS

(71) Applicant: Arbor Networks, Inc., Burlington, MA (US)

(72) Inventor: Aaron Campbell, Hammond Plains (CA)

(73) Assignee: Arbor Networks, Inc., Burlington, MA (US)

( * ) Notice: Subject to any disclaimer, the term of this patent is extended or adjusted under 35 U.S.C. 154(b) by 208 days.

(21) Appl. No.: 14/098,019

(22) Filed: Dec. 5, 2013

(65) Prior Publication Data

US 2015/0163241 A1    Jun. 11, 2015

(51) Int. Cl.
*H04L 29/00* (2006.01)
*H04L 29/06* (2006.01)

(52) U.S. Cl.
CPC ........ *H04L 63/1458* (2013.01); *H04L 63/1425* (2013.01)

(58) Field of Classification Search
CPC .................................................... G06F 15/173
USPC ........................................................ 709/224
See application file for complete search history.

(56) References Cited

U.S. PATENT DOCUMENTS

2002/0035628 A1* 3/2002 Gil ...................... H04L 12/2602
709/224

* cited by examiner

*Primary Examiner* — Jeffrey Pwu
*Assistant Examiner* — Michael D Anderson
(74) *Attorney, Agent, or Firm* — Locke Lord LLP; Scott D. Wofsy; Christopher J. Capelli

(57) ABSTRACT

A method and system for managing data traffic and protecting computing assets. The method and system includes analyzing HTTP requests to determine if the HTTP requests are overly segmented, and, if the HTTP request is overly segmented, blocking and/or black-listing the malevolent communications and computing device. The analysis to determine if an HTTP request is overly segmented includes comparing the packet's size to a threshold, identifying the packet's content or lack thereof, identifying whether the packet is the last packet in a communication, and identifying whether the packet ends with the "\n" ASCII character.

18 Claims, 3 Drawing Sheets

PROTECTING COMPUTING ASSETS FROM SEGMENTED HTTP ATTACKS

FIELD OF THE INVENTION

The present invention relates to protecting networks, and more particularly, to protecting computing assets from denial of service attacks utilizing overly segmented HTTP communications.

BACKGROUND OF THE INVENTION

As businesses become increasingly dependent on computerized communications, businesses concurrently become increasingly vulnerable to attacks on the underlying computer infrastructure. One such type of attack is a denial of service attack, which may take any number of forms. One such form is to overly segment HTTP communications, thus overwhelming a server.

Accordingly, there is an unmet need to protect computing assets from overly segmented HTTP communications in a denial of service attack, such as a distributed denial of service attack.

SUMMARY OF THE INVENTION

The purpose and advantages of the below described illustrated embodiments will be set forth in and apparent from the description that follows. Additional advantages of the illustrated embodiments will be realized and attained by the devices, systems, and methods particularly pointed out in the written description and the claims herein, as well as from the drawings.

To achieve these and other advantages and in accordance with the purpose of the illustrated embodiments, described herein are systems and methods for protecting computing assets from a denial of service attack taking the form of overly segmented HTTP requests. In one embodiment, a proxy is placed between a server and devices that may send HTTP requests to the server. Preferably the proxy is located "outside" the firewall, so as to also protect the firewall, but it is contemplated herein that the computing proxy device may be placed anywhere in the communication paths. The proxy monitors HTTP requests to identify overly segmented HTTP requests by analyzing information such as the packet size, the packet content (or lack thereof), whether the packet is the last packet in a communication, and whether the packet ends with the "\n" ASCII character. Based on these considerations, malevolent communications and/or computing devices may be identified, blocked and/or black listed.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail hereinbelow with reference to the drawings, wherein.

DETAILED DESCRIPTION OF CERTAIN EMBODIMENTS

Figure 1:
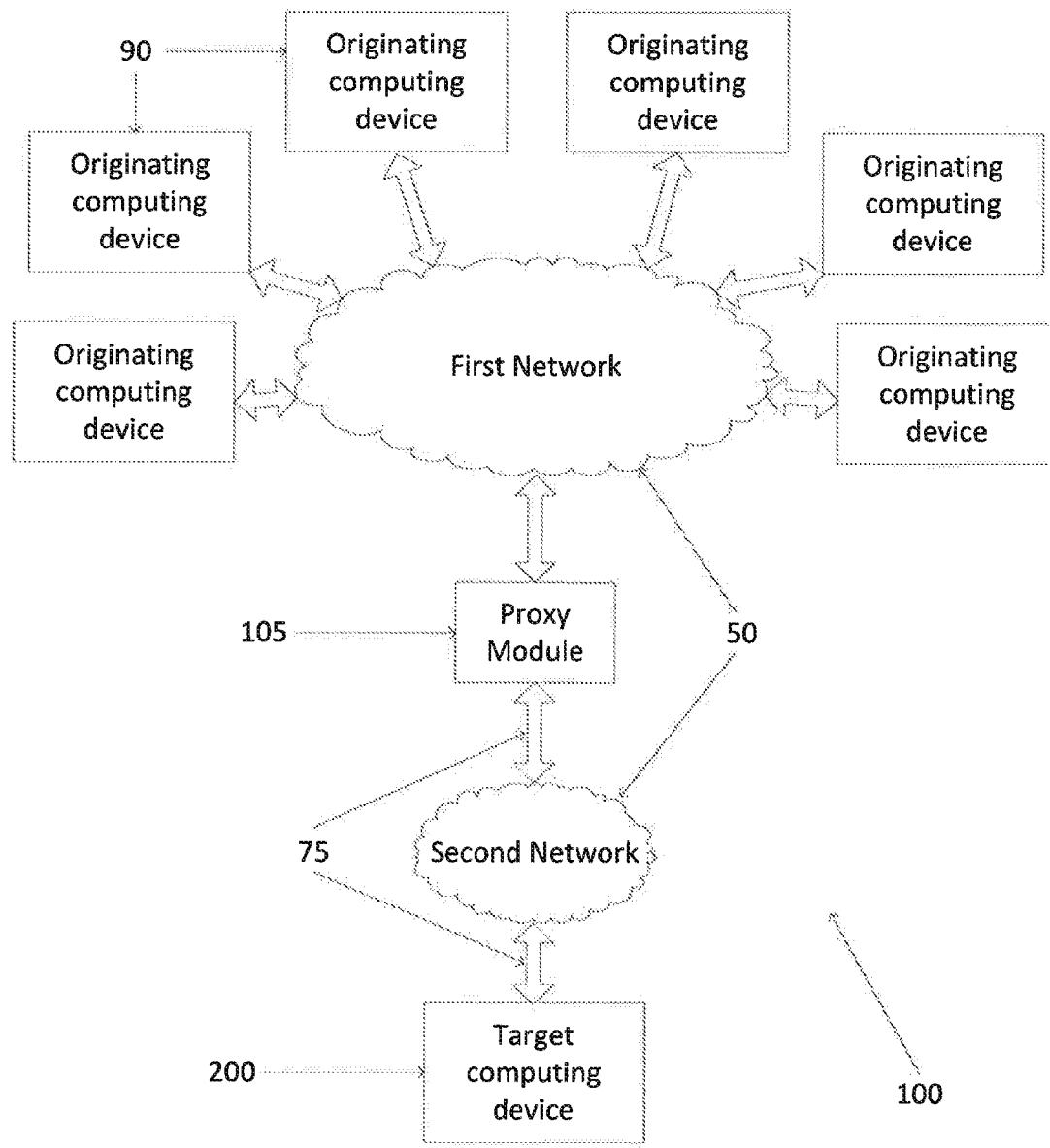
FIG. 1 illustrates a system diagram of an exemplary embodiment of a system for protecting computing assets from segmented HTTP attacks.

The below illustrated embodiments are directed to systems and methods for managing network traffic by identifying and blocking denial of service attacks predicated upon overly segmented HTTP requests. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" may include a plurality of such stimuli and reference to "the signal" may include reference to one or more signals and equivalents thereof as known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

The methods and systems described herein allow users to, in an exemplary use, monitor network traffic to protect one or more computing assets from Denial Of Service (DOS) attacks, such as Distributed Denial Of Service (DDOS) attacks, that are predicated upon overly segmented HTTP requests. The detection of overly segmented HTTP requests may be done by analyzing the packet size and comparing the packet's size to a predetermined threshold (e.g., 500 bytes, 1000 bytes), the packet content or lack thereof (e.g., if the TCP/IP packet consists and/or consists essentially of HTTP header data), whether the packet is the last one in the communication, and/or whether the packet ends with the "\n" ASCII character represented by 0A16 (i.e., the hexadecimal number "0A", which is equivalent to the decimal number 10). Based on these identifications, communications from computers sending such HTTP communications may be blocked and/or black listed (e.g., all communications from the offending computer are blocked, all communications from the offending computer's network are blocked, and/or the offending computer's IP is communicated to other networks to enable those networks to also block communications from the offending computer and/or its network).

Referring to FIG. 1, a hardware diagram depicting an environment 100 in which the processes described herein can be executed is provided for exemplary purposes. In one embodiment, environment 100 includes proxy module 105, networks 50, communications 75, originating computing devices 90, and target computing device 200.

Figure 2:
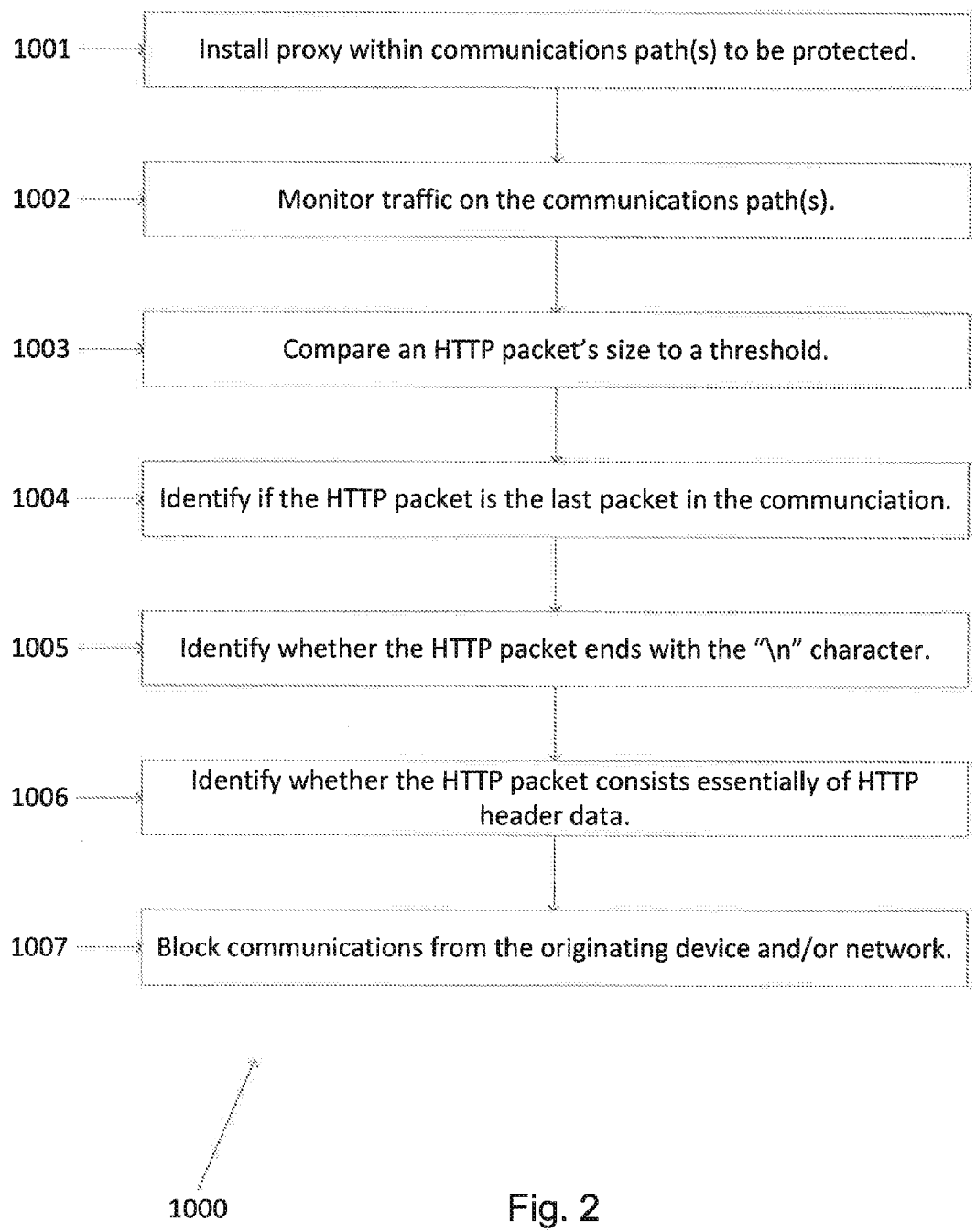
FIG. 2 is a flow chart illustrating an exemplary use of the embodiment of FIG. 1.

Turning to FIG. 2, illustrated therein is in an exemplary process 1000 of utilizing proxy module 105. Starting at step 1001, proxy module 105 is installed on one or more communication paths to be protected (best shown in FIG. 1, where proxy module 105 is placed between originating devices 90 and target computing device 200). It is contemplated herein that proxy module 105 may be placed anywhere along the communications path, including for exemplary purposes only and without limitation, "behind" the firewall (the term "behind" being from the perspective of the network that the firewall is protecting; in other words, in this scenario proxy module 105 is placed on the same side of the firewall as the rest of the network), "in front of" the firewall (should be self-explanatory in light of the previous parenthetical), within the firewall (e.g., as a piece of software, firmware and/or any computing instructions that may execute within the firewall to provide the functionality and/or methods described herein), "in front of" the modem and/or device communicating with the Internet Service Provider (ISP) (e.g., within the ISP's network, at the border between the ISP and the modem), and/or within the modem and/or device communicating with the ISP. It is further contemplated herein that, for exemplary purposes only and without limitation, proxy module may be implemented on a separate piece of hardware that only executes the embodiments and methods described herein, and/or as software and/or firmware that executes on electronics that do and/or may provide other functionality (e.g., a firewall, a modem).

Subsequently, traffic on communication path(s) is monitored by proxy module 105 (step 1002). The communication paths are between target computing device 200 and originating devices 90 that send HTTP requests to target computing device 200. Proxy module 105 may compare an HTTP packet's size (step 1003) to a packet size threshold (e.g., 500 bytes, 1,000 bytes), identify whether the HTTP packet is the last packet (step 1004) in the communication (e.g., when an HTTP request is too large for one packet the request may be broken into any number of packets), identify whether the HTTP packet ends with the "\n" character that is represented by 0A16 in the American Standard Code for Information Interchange (ASCII), and/or identify whether the HTTP packet consists mainly and/or essentially of HTTP header data (step 1006).

In one embodiment, all four of these conditions must be met in three successive packets to qualify as overly segmented HTTP packets. In another embodiment, some of the conditions (e.g., two, three) must be met in a subset of packets (e.g., two out of three successive packets, four out of six, three out of four, two/three/four packets in a single HTTP request, or any combination and/or derivative as would be recognized by those skilled in the art).

In one embodiment, the packet size threshold is significantly less than a Maximum Transmission Unit (MTU) for a communication path (e.g., if the MTU is 1500, the threshold may be 500, 750, and/or 1000).

After an HTTP request with overly segmented packets is identified, the resultant action may be (step 1007), for exemplary purposes only and without limitation, communications from the originating computing device being blocked, communications from the originating computing device's network being blocked, identifying information (e.g., domain, IP address, IP block) about the originating computing device being communicated to one or more other network managers, in the form of an alert, and the other network manager(s) may elect to block the originating computing device themselves.

Figure 3:
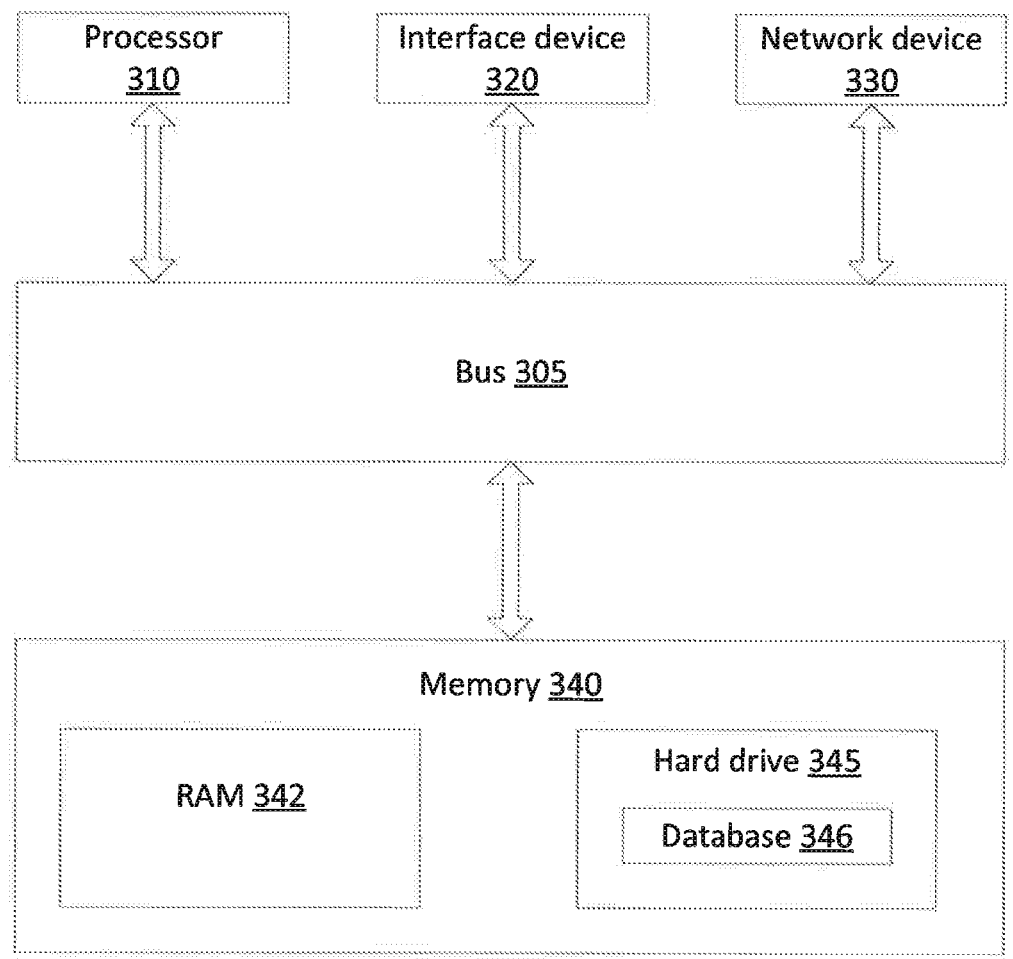
FIG. 3 is an illustration of an embodiment of a computing device.

Turning now to FIG. 3, illustrated therein is an exemplary embodiment of computing device 300 that preferably includes bus 305, over which intra-device communications preferably travel, processor 310, interface device 320, network device 330, and memory 340, which preferably includes RAM 342 and hard drive 345 and database 346. In FIG. 1, proxy module 105, target computing device 200 and originating computing device 90 preferably include computing device 300 and the components thereof.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Memory 340 is a computer-readable medium encoded with a computer program. Memory 340 stores data and instructions that are readable and executable by processor 310 for controlling the operation of processor 310. Memory 340 may be implemented in random access memory 342 (RAM), a non-transitory computer readable medium, volatile or non-volatile memory, solid state storage devices, magnetic devices, hard drive 345, database 346, a read only memory (ROM), or a combination thereof.

Processor 310 is an electronic device configured of logic circuitry that responds to and executes instructions. Processor 310 outputs results of an execution of the methods described herein. Alternatively, processor 310 could direct the output to a remote device (not shown) via network(s) 50.

It is to be further appreciated that networks 50 depicted in FIG. 1 can include a local area network (LAN) and a wide area network (WAN), other networks such as a personal area network (PAN), or any combination thereof. Further, each network 50 in FIG. 1 may include the exact same network configurations, completely different network configurations, or any combination thereof. Such networking environments are commonplace in offices, enterprise-wide computer networks, intranets, and the Internet. For instance, when used in a LAN networking environment, the proxy module 105 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to proxy module 105, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 300 each generally include at least one processor, at least one interface, and at least one memory device coupled via buses. Computing devices 300 may be capable of being coupled together, coupled to peripheral devices, and input/output devices. Computing devices 300 are represented in the drawings as standalone devices, but are not limited to such. Each can be coupled to other devices in a distributed processing environment.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer-implemented method of detecting a Denial of Service (DoS) attack comprising: determining a size of a plurality of segmented HTTP packets that comprise a communication; and detecting an occurrence of a DoS attack on a server based on whether the following first conditions are satisfied: the determined size of a packet of the plurality of segmented HTTP packets is less than a threshold value; and the HTTP packet is not the last packet in the communication.

2. The computer-implemented method of claim 1, wherein the step of detecting is further based on determining whether the following second conditions are satisfied: whether the HTTP packet does not end with the "\n" ASCII character represented by $0A_{16}$; and whether the HTTP packet consists essentially of HTTP header data.

3. The computer-implemented method of claim 2, wherein the HTTP packets are sent from a computer and directed to the server, and wherein the step of detecting an attack comprises identifying at least three consecutive HTTP packets that satisfy the first and second conditions.

4. The computer-implemented method of claim 1, wherein the communication from the computer to the server traverses a path with a Maximum Transmission Unit (MTU), and wherein the threshold is significantly less than the path's MTU.

5. The computer-implemented method of claim 2, wherein the step of detecting an attack comprises identifying at least two packets in the communication that satisfy the first and second conditions.

6. The computer-implemented method of claim 2, wherein the step of detecting an attack comprises identifying at least three packets in the communication that satisfy the first and second conditions.

7. The computer-implemented method of claim 1, wherein the threshold is selected from the range of 400 bytes to 1000 bytes.

8. The computer-implemented method of claim 1, the method further comprising stopping all communications from the computer to the server.

9. The computer-implemented method of claim the method further comprising:
generating a reset packet; and
issuing the reset packet to the server, wherein the reset packet is configured to instruct the server to release resources consumed by the DoS attack.

10. The computer-implemented method of claim 1, the method further comprising sending an alert that a Denial of Service attack was detected.

11. A computer-implemented method for detecting a Denial of Service (DoS) computer attack upon a server, comprising: determining whether an HTTP request is overly segmented, including; determining whether a packet size of more than one consecutive packet of the HTTP request is less than a threshold value; and determining that none of the more than one consecutive packets ends with a newline character; and detecting the occurrence of a DoS attack if the HTTP request is determined to be overly segmented.

12. The computer-implemented method of claim 11 further comprising blacklisting a source host of the HTTP request if it is determined none of the more than one consecutive packets ends with a newline character.

13. A computer-implemented method of detecting a Denial of Service (DoS) attack in a communication from a computing device to a server, the communication comprising HTTP packets and the method comprising:
determining which HTTP packets in the communication satisfy all three of the following conditions:
(a) whether the HTTP packet is not the last packet in the communication;
(b) whether the HTTP packet does not end with the "\n" ASCII character represented by $0A_{16}$; and
(c) whether the HTTP packet consists essentially of HTTP header data.

14. The computer-implemented method of claim 13, the method further comprising:
determining if three successive HTTP packets in the communication satisfied the three conditions; and
identifying that a DoS attack is occurring based on three successive HTTP packets in the communication satisfying the three conditions.

15. The computer-implemented method of claim 13, the method further comprising:
determining if two successive HTTP packets in the communication satisfied the three conditions; and
identifying that a DoS attack is occurring based on two successive HTTP packets in the communication satisfying the three conditions.

16. The computer-implemented method of claim 13, the method further comprising:
determining if at least three HTTP packets in the communication satisfied the three conditions; and
identifying that a DoS attack is occurring based on at least three HTTP packets in the communication satisfying the three conditions.

17. The computer-implemented method of claim 13, the method further comprising:
identifying that a DoS attack has occurred;
generating a reset packet; and issuing the reset packet to the server, wherein the reset packet is configured to instruct the server to release resources consumed by the DoS attack.

18. The computer-implemented method of claim 13, wherein it is further determined which HTTP packets have a packet size less than a predetermined threshold, and wherein the communication from the computer to the server traverses a path with a Maximum Transmission Unit (MTU), and wherein the threshold is significantly less than the path's MTU.

* * * * *